(12) United States Patent
Lin et al.

(10) Patent No.: US 6,661,944 B1
(45) Date of Patent: Dec. 9, 2003

(54) OPTICAL ADD/DROP MULTIPLEXER

(75) Inventors: Shih-Chiang Lin, Kaohsiung (TW); Wei-Jen Chou, Hsinchu (TW); Hsin-Chien Chiang, Taichung (TW); Jiun-Shyong Wu, Taoyuan Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/482,426

(22) Filed: Jan. 13, 2000

(30) Foreign Application Priority Data

Sep. 22, 1999 (TW) .......................... 88116273 A

(51) Int. Cl.⁷ .............................. G02B 6/28; H04J 14/02
(52) U.S. Cl. .............................. 385/24; 385/31; 385/33; 385/34; 398/83; 398/85; 398/88
(58) Field of Search .............................. 385/24, 31, 33, 385/34; 398/43, 48, 49, 83, 88, 85

(56) References Cited

U.S. PATENT DOCUMENTS

| | | | | |
|---|---|---|---|---|
| 5,583,683 A | * | 12/1996 | Scobey ........................ | 398/79 |
| 5,737,104 A | * | 4/1998 | Lee et al. ..................... | 398/79 |
| 5,786,915 A | * | 7/1998 | Scobey ........................ | 398/82 |
| 6,167,171 A | * | 12/2000 | Grasis et al. ................. | 385/24 |
| 6,320,996 B1 | * | 11/2001 | Scobey et al. ................ | 385/18 |
| 6,418,250 B1 | * | 7/2002 | Corbosiero et al. ........... | 385/24 |

* cited by examiner

*Primary Examiner*—Brian Healy
(74) *Attorney, Agent, or Firm*—J.C. Patents

(57) ABSTRACT

An optical add/drop multiplexer capable of extracting signals from within a specified waveband in a group of signals containing various wavelengths, and then adding back a new set of signals also within the specified waveband. The multiplexer includes an optical filter plate, a plane reflector and three graded-index lenses. Using a single optical filtering plate and a plane reflector to carry out multiple reflections, intra-band isolation of light signals is improved and cost of production is reduced.

8 Claims, 3 Drawing Sheets

OPTICAL ADD/DROP MULTIPLEXER

CROSS-REFERENCE TO RELATED APPLICATION

This application claims the priority benefit of Taiwan application serial no. 88116273, filed Sep. 22, 1999.

BACKGROUND OF THE INVENTION

1. Field of the Invention

The present invention relates to an optical add/drop multiplexer. More particularly, the present invention relates to an optical add/drop multiplexer that comprises an optical filter plate and a plane reflector.

2. Description of the Related Art

FIG. 1 is a sketch of a conventional optical add/drop module. As shown in FIG. 1, the module includes a drop multiplexer 10 and an add multiplexer 20. The drop multiplexer 10 includes an input graded-index lens 12, a dropout filter plate 14 and a dropout graded-index lens 16. The add multiplexer 20 includes an output graded-index lens 22, an add filter plate 24, and an add graded-index lens 26. Both the dropout filter plate 14 and the add filter plate 24 are involved in filtering electromagnetic waves of the same wavelength.

A group of incoming optical signals containing signals of various wavelengths is first coupled to the input graded-index lens 12 so that the signals are delivered to the dropout filter plate 14. The filter plate 14 block out all signals except signals at a specified waveband so that the signals at the specified waveband are permitted to pass through the filter 14 and couple with the dropout graded-index lens 16. Signals of the specified waveband or the so-called dropout signals can be read at the other side of the dropout graded-index 16. Meanwhile, blocked signals outside the specified wavelength are reflected back by the dropout filter plate 14.

However, only a portion of signals having the specified wavelength penetrate through the dropout filter plate 14. Hence, a small portion of the signals within the specified waveband will be reflected back by the filter plate 14 together with the rest of the group of signals. Thus, the signal within the specified waveband together with the rest of the group of signals needs to be further deliver to the add filter plate 24. When the group of signals reaches the add filter plate 24, the remaining signals within the specified waveband are able to penetrate through. Consequently, strength of the signals within the specified waveband after reflection from the add filter plate 24 is further reduced to an acceptable low-level. In addition, add-in signals can be added by shining a beam with add-in signals onto the graded-index lens 26. The add-in signals are also within the specified waveband so that the add-in signals can penetrate through the add filter plate 24 and mix with the original group of signals reflected from the add filter plate 24. The add-in signals and the original group of signals emerge from the graded-index lens 22 as a group of output signals. Since the original signals within the specified waveband have been reduced to acceptable low-level, the newly added signals, also within the specified waveband, are unaffected and does not increase the bit error rate.

FIGS. 2a and 2b are patented optical add/drop multiplexers (U.S. Pat. No. 5,712,727). In FIG. 2a, the add/drop multiplexer has two optical filter plates 110 and 120 and four graded-index lenses 112, 114, 122, and 124. Functions of the filter plates 110 and 120 and the graded-index lenses 112, 114, 122, and 124 are similar to the filter plates 14 and 24 and the graded-index lenses 12, 16, 22, and 26 of FIG. 1.

When an incoming light beam containing a group of signals at various wavelengths reaches at the first filter plate 110, only the signals within a specified waveband can penetrate through the filter plate 110 and a optical fiber grating 116 to become dropout signals for reading. Meanwhile, signals having wavelengths outside the specified range are reflected by the filter plate 110. In addition, the optical fiber grating 116 further intercept the signals having wavelengths outside the specified range. An optical fiber grating 130 is installed to intercept the reflected light from the filter plate 110 so that residual signals within the specified waveband after first reflection are further reduced. Finally, any remaining signals within the specified waveband are removed on reflection from the second filter plate 120 so that strength of signals within the specified waveband is reduced to an acceptable level. Additional signals can also be added to the reflected signals from the second filter 120 by shining a beam of light containing the add-in signals through filter plate 120. Ultimately, a group of output signals emerges from the second filter 120.

The major disadvantage of this type of optical add/drop multiplexer is that two filter plates 110 and 120 must be used. Furthermore, the group of input optical signals, the group of output optical signals, the add-in signals and the dropout signals must couple with graded-index lenses 112, 114, 122, and 124. Hence, cost of implementation will be high.

The alternative arrangement as shown in FIG. 2b has a filter plate 210, two graded-index lenses 212 and 214, and a 2×1 optical fiber coupler 220. Function of the filter plate 210 is similar to the filter plate 14 as shown in FIG. 1. Signals within a specified waveband in a group of input optical signals are able to penetrate through the filter plate 210 to become dropout signals for reading. The optical fiber grating 216 further filter our undesired signals after the input signals penetrate through the filter plate 210. Other signals contained within the group are reflected by the filter plate 210. An optical fiber grating 230 is installed to intercept the reflected light from the filter plate 210 so that residual signals within the specified waveband are further reduced. Finally, light signals from the optical fiber grating 230 and any additional add-in signals are integrated inside a 2×1 optical fiber coupler 220 so that a group of output optical signals emerges from the coupler 220.

The major disadvantage for this type of optical add/drop multiplexer is the use of a 2×1 optical coupler 220. This is because strength of the group of output optical signals will be reduced by half (representing a 3 dB coupling loss).

SUMMARY OF THE INVENTION

The invention provides a type of optical add/drop multiplexer. The multiplexer comprises a first lens 310, a second lens 330 and a third lens 320, a reflector 350, and an optical filtering device 340. The first lens is used for receiving and transmitting a group of optical signals. The group of optical signals contains a spectrum of wavelengths. The optical filtering device includes an optical filter plate and a reflector. The optical filter plate receives the entire group of optical signals, but permits only a specified waveband within the spectrum of wavelengths to penetrate through. Signals from other part of the spectrum are reflected back and forth a number of times between the filter plate and the reflector. On the last reflection from the filter plate, the rest of the group signals with the acceptable low-level signals within the specified waveband emerge as a group of output signals. The second lens picks up the signals within the specified waveband from the filter plate to become dropout signals for reading. The second lens also receives add-in signals having wavelengths within the specified waveband and passes them through the optical filter plate. The third lens integrates the rest of the group signals, the acceptable low-level signals within the specified waveband and the add-in signals from the filter plate, and then transmits the mixed signals out as a group of optical output signals.

This invention also provides a type of optical add/drop multiplexer that includes a glass substrate. An anti-reflection coating is plated over a first planar surface of the substrate while an optical filtering film is coated over a second planar surface of the substrate. The first planar surface and the second planar surface are parallel to each other. The anti-reflection coating receives a group of incoming optical signals and then transmits the signals to the substrate. The group of optical signals includes a spectrum of wavelengths. The optical filtering film picks up the group of transmitted signals from the anti-reflection coating, but permits only signals within a specified waveband of the spectrum to pass through. Signals within the specified waveband penetrate through the optical filtering film as dropout signals for reading. Signals from other part of the spectrum are reflected back and forth inside the substrate between the filtering film and the reflection coating. On the last reflection from the filtering film, the rest of the group signals with the acceptable low-level of specified waveband signals emerge as a group of output signals. The optical filtering film is further capable of receiving add-in signals having wavelength within the specified waveband and then transmitting them to the output coating. The output coating integrates the rest of group signals, the acceptable low-level signals within the specified waveband and the add-in signals from the filter plate, and then transmits the integrated signals out as a group of optical output signals.

Accordingly, the present invention uses just one optical filter plate and a reflector. Multiple optical reflections occur between the filter and the reflector such that intra-band isolation is increased and cost of production is decreased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
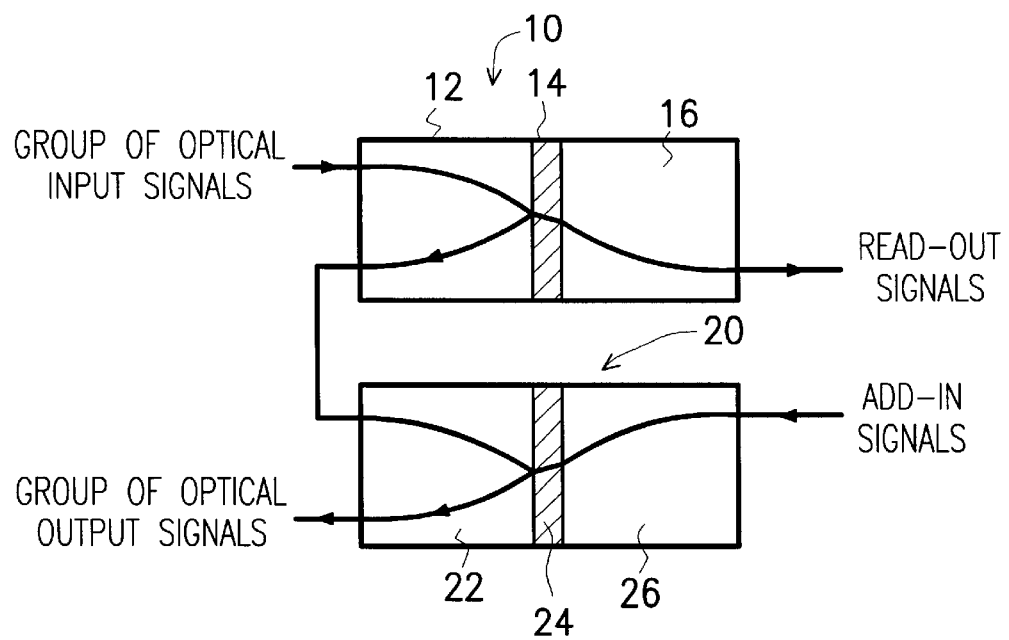
FIG. 1 is a sketch of a conventional optical add/drop module.
Figure 2A:
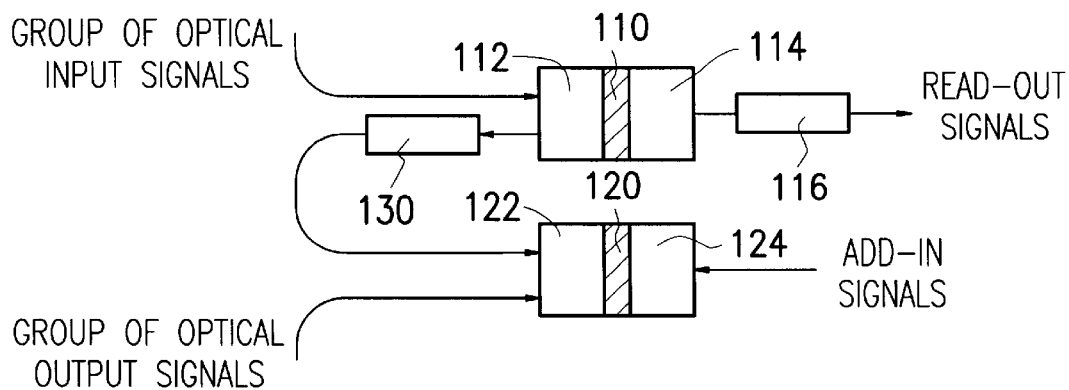
FIGS. 2a and 2b are conventional patented optical add/drop multiplexers.
Figure 2B:
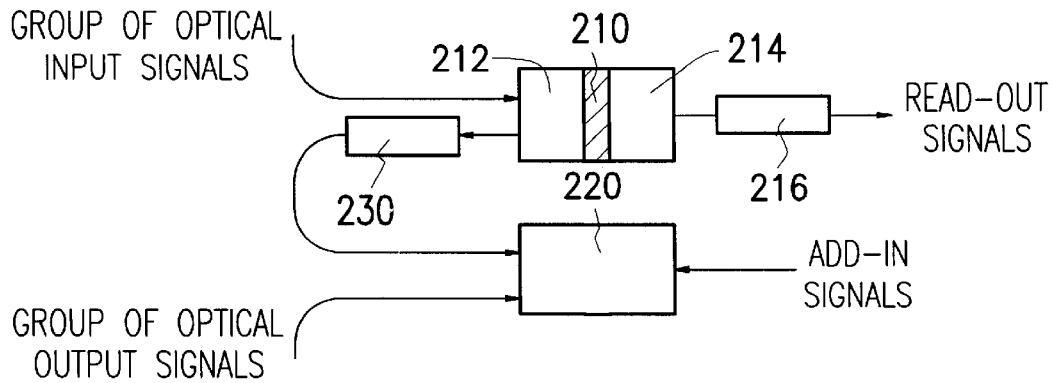

Reference will now be made in detail to the present preferred embodiments of the invention, examples of which are illustrated in the accompanying drawings. Wherever possible, the same reference numbers are used in the drawings and the description to refer to the same or like parts.

Figure 3A:
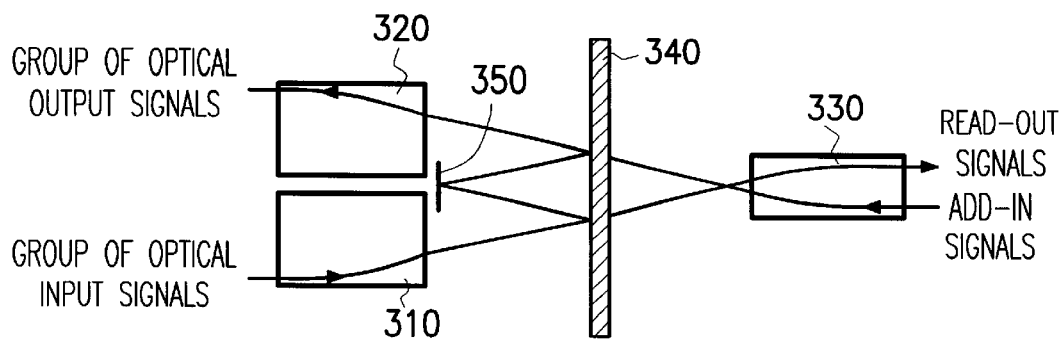
FIG. 3a is a sketch of an optical add/drop multiplexer according to a first embodiment of this invention.

FIG. 3a is a sketch of an optical add/drop multiplexer according to a first embodiment of this invention. In FIG. 3a, a light beam containing a group of optical signals in a spectrum of wavelengths is coupled to a first graded-index lens 310. The first graded-index lens 310 receives the group of signals and then transmits the signals to an optical filter plate 340. When the group of signals reaches the filter plate 340, only signals within a specified waveband are permitted to penetrate.

An optical filter device includes a filter plate 340 and a reflector 350. The filter plate 340 receives the signals penetrated through the first graded-index lens 310 and only allows signals with a specified waveband to penetrate. The other signals in other wavebands and the remaining signals with a specified waveband are reflected back and forth between the filter plate 340 and a reflector 350 several times (only one reflection is shown FIG. 3a). Whenever the light beam bounces off from the optical filter plate 340, more of the signals within the specified waveband are removed because the signals within the specified waveband are able to penetrate the filter plate 340. On the last reflection from the filter plate 340, strength of the dropout signals within the specified waveband is further reduced to an acceptable level, the rest of signals containing the wavelengths outside the specified waveband emerge as a group of output signals.

A second graded-index lens 330 is used to pick up signals within the specified waveband going through the optical filter plate 340 and transmit them as dropout signals for reading. This second graded-index lens 330 is also capable of receiving a beam of add-in signals within the specified waveband. The add-in signals are transmitted through the second graded-index lens 330 and pass through the optical filter plate 340.

A third graded-index lens 320 receives the filtered group of output signals and the add-in signals to become a group of output signals.

Figure 3B:
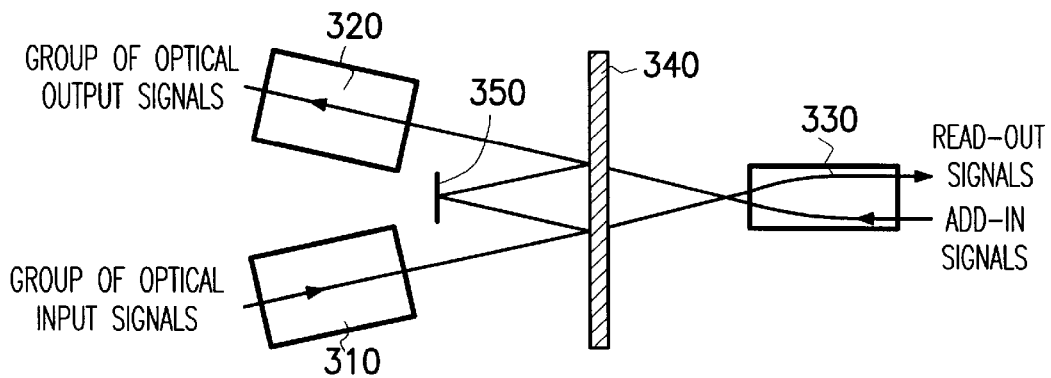
FIG. 3b is a sketch of an optical add/drop multiplexer according to a second embodiment of this invention.

FIG. 3b is a sketch of an optical add/drop multiplexer according to a second embodiment of this invention. Except for the tilting of the axis of the first graded-index lens 310 and the third graded-index lens 320 so that the axes form a certain angle, operating principles in the second embodiment are identical to the first embodiment.

Figure 3C:
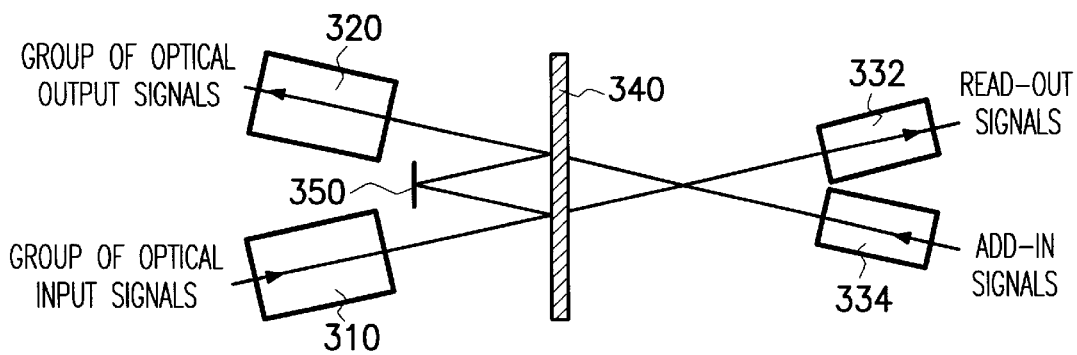
FIG. 3c is a sketch of an optical add/drop multiplexer according to a third embodiment of this invention.

FIG. 3c is a sketch of an optical add/drop multiplexer according to a third embodiment of this invention. In the third embodiment of this invention, a single graded-index lens is replaced by a graded-index dropout signal lens 332 and a graded-index add-in signal lens 334. The dropout signal lens 332 is used solely for receiving signals within the specified waveband from the optical filter plate 340 and transmitting the signals for readout. The add-in signals lens 334 is used for coupling with add-in signals within the specified waveband and then delivering the add-in signals through the optical filter plate 340.

Figure 4:
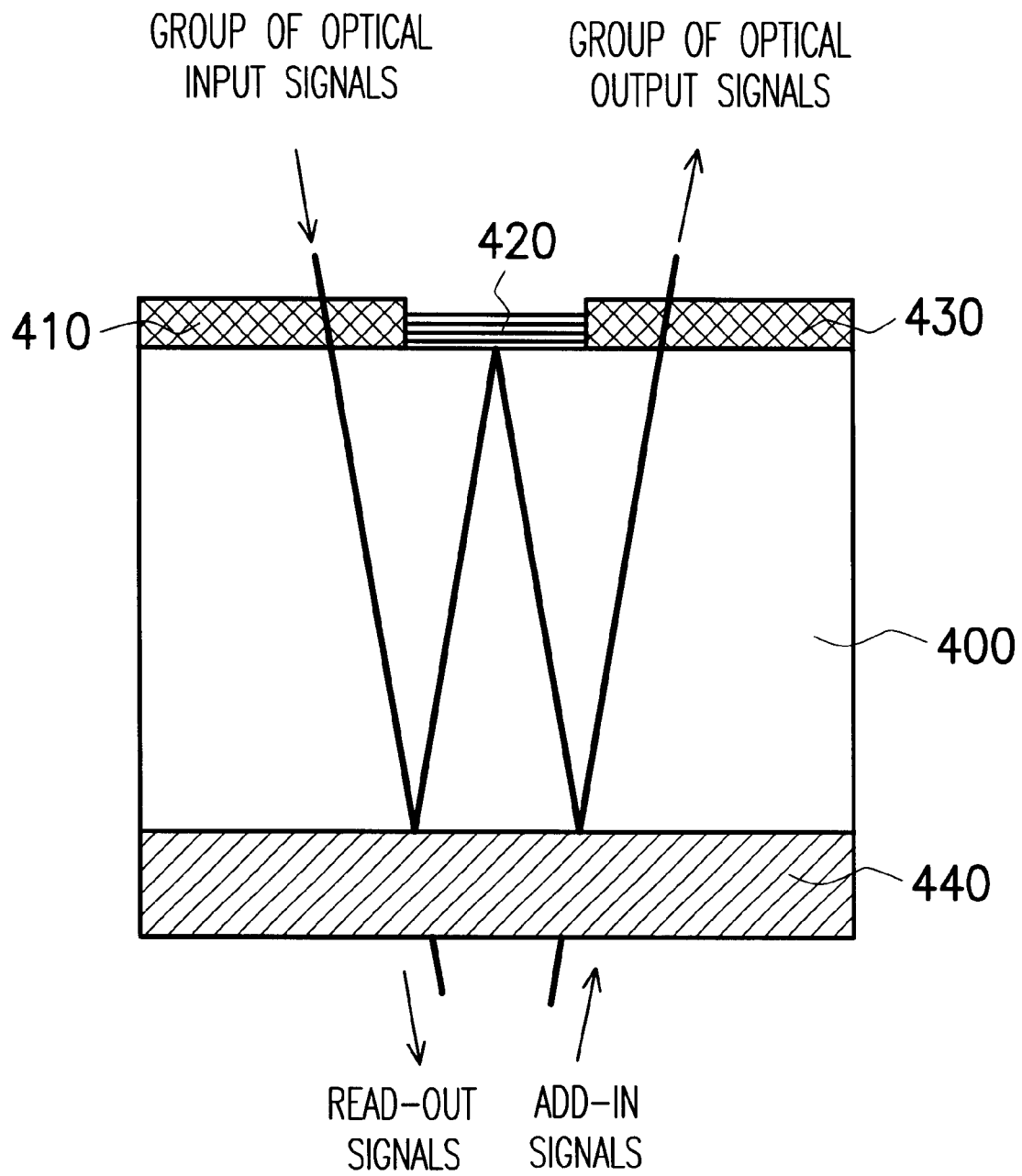
FIG. 4 is a sketch of an optical add/drop multiplexer implemented using a piece of glass substrate according to a fourth embodiment of this invention.

FIG. 4 is a sketch of an optical add/drop multiplexer implemented using a piece of glass substrate according to a fourth embodiment of this invention. As shown in FIG. 4, an anti-reflection coating 410, a reflecting coating 420, and an output coating 430 are coated on a first surface of a glass substrate 400. An optical filtering layer 440 is coated on a second surface of the substrate 400 parallel the first surface. The output coating 430 is also an anti-reflection coating which is the same as 410.

The anti-reflection coating 410 picks up an incoming beam of light containing a group of signals in a spectrum of wavelengths and then transmits the signal beam to the glass substrate 400. The optical filtering layer 440 receives the optical signals from the anti-reflection coating 410 and transmits signals within a specified waveband through the filtering layer 440 to become dropout signals for readout. The beam of light containing signals outside the specified waveband and remaining signals within a specified waveband are reflected back and forth between the optical filtering layer 440 and the reflection coating 420 in the glass medium for several times (only a single reflection is shown in FIG. 4). After the last reflection from the filtering layer 440, signals outside the specified waveband are output from the output coating 430. The optical filtering layer 440 is also capable of receiving add-in signals within the specified waveband so that the add-in signals can penetrate through the optical filtering layer 440. In addition, the output coating 430 is capable of receiving the output signals and the add-in signals and integrating the signals to form a group of output signals.

The advantages of forming an optical add/drop multiplexer on a piece of glass substrate at least include:

1. A light beam can be more precisely aligned inside a glass board so that mass-production is possible.

2. The divergent angle of light passing through glass is much smaller than passing through air. A smaller divergent angle for light can reduce loss due to signal attenuation.

Table 1 is a comparison of various properties between a conventional add/drop multiplexer module and the multiplexer of this invention.

TABLE 1

|  | According to this invention | Conventional module |
| --- | --- | --- |
| Insertion loss of other wavelengths | 0.65 dB* | 1.6 dB |
| Dropout Insertion Loss | 0.81 dB* | 2.0 to 2.5 dB |
| Add-in Insertion Loss | 0.81 dB* | 1.6 dB |
| Intra-band Isolation | −27.6 dB | −25 to −30 dB |
| Inter-band Isolation | −30.0 dB | −25 to −30 dB |

The data marked with * represents data without consideration of the loss caused by coupling with the graded-index lens.

In FIG. 3, according to our invention, intra-band isolation increases to 27.6 dB after filtering twice by the filtering plate 340, and increases to 40.8 dB after filtering three times by the filtering plate 340.

In summary, major advantages of this add/drop multiplexer include the use of just one optical filtering plate and a reflector. The filtering plate and the reflector reflect an incoming beam of light back and forth a number of times so that the extent of intra-band isolation is greatly improved. Moreover, using just one optical filter plate reduces the cost of producing the multiplexer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical add/drop multiplexer, comprising:
   a first lens for receiving and emitting a group of light signals, wherein the light signals includes a spectrum of wavelengths;
   an optical filtering device that includes an optical filter plate and a reflector, wherein the optical filter plate receives the group of incoming light signals and permits the transmission of signals within a specified waveband through the filter plate so that signals outside the specified waveband and a remaining signals within a specified waveband are reflected back and forth between the filter plate and the reflector several times, and the signals from the last reflection from the filter plate emerge as a group of output signals that contain the low-level signals within the specified waveband;
   a second lens for receiving signals from the specified waveband after passing through the optical filter plate to become dropout signals for readout, wherein the second lens is also capable of receiving add-in signals within the specified waveband and delivering the add-in signals to the optical filtering device where the add-in signals are permitted to penetrate; and
   a third lens for integrating the output signals with the low-level signals in the specified waveband and the add-in signals and then transmitting the signals thus integrates as a group of output signals.

2. The multiplexer of claim 1, wherein the first lens includes a graded-index lens.

3. The multiplexer of claim 1, wherein the second lens includes a graded-index lens.

4. The multiplexer of claim 1, wherein the third lens includes a graded-index lens.

5. The multiplexer of claim 1, wherein the second lens includes a read-out lens and an add-in lens and the read-out lens receives the light signals within the specified waveband after going through the optical filter plate for read-out purposes, whereas the add-in lens receives the add-in signals and delivers the add-in signals to the optical filter plate.

6. The multiplexer of claim 5, wherein the read-out lens includes a graded-index lens.

7. The multiplexer of claim 5, wherein the add-in lens includes a graded-index lens.

8. An optical add/drop multiplexer implemented on a piece of glass, comprising a glass substrate, wherein:
   the first surface includes an anti-reflection coating, a reflection coating, and an output coating, and the second surface includes an optical filtering layer;
   the anti-reflection coating receives a group of light signals that contains signals of various wavelengths and re-transmits them into the substrate;
   the optical filtering layer receives the group of signals coming from the anti-reflection coating and permits only signals within a specified waveband to pass through and become read-out signals;
   other signals outside the specified waveband are reflected back and forth between the optical filtering layer and the reflection coating several times inside the glass medium, and the signals from the last reflection from the filtering layer emerge from the output coating as a group of output signals with the low-level signals within the specified waveband;
   the optical filtering layer is further capable of receiving add-in signals within the specified waveband;
   and the output coating integrates the signals after several internal reflections and the add-in signals, and then transmits the integrated signals as a group of output signals.

* * * * *